(12) United States Patent  
Komatsu (10) Patent No.: US 9,086,272 B2
(45) Date of Patent: Jul. 21, 2015

(54) PROFILE MEASURING APPARATUS, METHOD FOR MANUFACTURING STRUCTURE, AND STRUCTURE MANUFACTURING SYSTEM

(75) Inventor: Manabu Komatsu, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 589 days.

(21) Appl. No.: 13/273,265

(22) Filed: Oct. 14, 2011

(65) Prior Publication Data
US 2012/0105867 A1 May 3, 2012

(30) Foreign Application Priority Data

Oct. 27, 2010 (JP) ................................. 2010-240963

(51) Int. Cl.
G01B 11/30 (2006.01)
G01B 11/14 (2006.01)
G01B 11/24 (2006.01)
G01B 11/25 (2006.01)

(52) U.S. Cl.
CPC ....................................... G01B 11/25 (2013.01)

(58) Field of Classification Search
USPC ..................... 356/237.1–241.6, 242.1–243.8, 356/426–431, 600–640
See application file for complete search history.

(56) References Cited

U.S. PATENT DOCUMENTS 3,751,647 A * 8/1973 Maeder et al. ................ 713/401
3,826,558 A * 7/1974 Rasberry et al. .............. 359/393
4,122,525 A * 10/1978 Eaton ........................ 250/559.22
4,742,237 A * 5/1988 Ozawa ...................... 250/559.08
4,895,448 A * 1/1990 Laird ............................. 356/603
5,105,149 A * 4/1992 Tokura ........................ 356/237.5
5,289,264 A * 2/1994 Steinbichler .................. 356/605
5,671,056 A 9/1997 Sato
5,848,188 A * 12/1998 Shibata et al. ................ 382/203
5,886,775 A * 3/1999 Houser et al. ................ 356/4.01
6,044,170 A * 3/2000 Migdal et al. ................ 382/154
6,081,739 A * 6/2000 Lemchen ..................... 600/407

(Continued)

FOREIGN PATENT DOCUMENTS

CN 1437000 A 8/2003
DE 42 08 455 A1 9/1993

(Continued)

OTHER PUBLICATIONS

International Search Repor/Written Opinion mailed Feb. 1, 2012 in corresponding PCT Application No. PCT/JP2011/074242.

(Continued)

Primary Examiner — Kara E Geisel
Assistant Examiner — Jarreas C Underwood
(74) Attorney, Agent, or Firm — Finnegan, Henderson, Farabow, Garrett & Dunner, LLP (57) ABSTRACT

There is provided a profile measuring apparatus which measures a profile of an object including: a projection unit which projects a pattern on the object from a projection direction; a measurement unit, which is displaced at a difference position for the projection unit and takes an image of the pattern from a direction different from the projection direction to measure a position on a surface of the object based on an image data obtained with the taken image; an object-rotation unit which rotates the object in two directions; and a pattern-rotation unit which is connected to the projection unit so as to be able to rotate the pattern relative to the object-rotation unit.

29 Claims, 7 Drawing Sheets

(56) References Cited

U.S. PATENT DOCUMENTS

| | | | |
|---|---|---|---|
| 6,396,069 B1 | 5/2002 | MacPherson et al. | |
| 6,549,289 B1* | 4/2003 | Ellis | 356/603 |
| 6,556,783 B1* | 4/2003 | Gelphman | 396/20 |
| 6,847,462 B1* | 1/2005 | Kacyra et al. | 356/601 |
| 6,986,636 B2* | 1/2006 | Konig et al. | 414/763 |
| 6,999,072 B2* | 2/2006 | Imai | 345/419 |
| 7,061,628 B2* | 6/2006 | Franke et al. | 356/604 |
| 7,379,193 B2* | 5/2008 | Liu | 356/603 |
| 7,382,471 B2* | 6/2008 | Franke et al. | 356/604 |
| 8,146,024 B2* | 3/2012 | Chan et al. | 716/52 |
| 8,494,800 B2 | 7/2013 | Matsushita | |
| 2003/0007159 A1 | 1/2003 | Franke et al. | |
| 2005/0068544 A1 | 3/2005 | Doemens et al. | |
| 2005/0174581 A1 | 8/2005 | Liu | |
| 2006/0082787 A1 | 4/2006 | Franke et al. | |
| 2006/0103854 A1 | 5/2006 | Franke et al. | |
| 2007/0156379 A1* | 7/2007 | Kulkarni et al. | 703/14 |
| 2012/0194651 A1 | 8/2012 | Kanto et al. | |

FOREIGN PATENT DOCUMENTS

| | | |
|---|---|---|
| EP | 1 195 575 A1 | 4/2002 |
| EP | 1 519 141 A2 | 3/2005 |
| JP | 05-322527 A | 12/1993 |
| JP | H05-322527 A | 12/1993 |
| JP | 08-136224 A | 5/1996 |
| JP | H08-136224 A | 5/1996 |
| JP | 08-327337 A | 12/1996 |
| JP | H08-327337 A | 12/1996 |
| JP | 2002-066771 A | 3/2002 |
| JP | 2004-085221 A | 3/2004 |
| JP | 2010-160084 | 7/2010 |
| JP | 2010-216939 A | 9/2010 |
| WO | WO 01/01064 A2 | 1/2001 |

OTHER PUBLICATIONS

Notice of Reasons for Rejection for corresponding Office Action of Japanese Patent Application No. 2013-519880, issued Mar. 24, 2014, mailed Apr. 1, 2014.

Decision of Refusal mailed Nov. 25, 2014 re Japanese Patent Application No. 2013-519880.

Chinese Office Action mailed Jan. 26, 2015 re Chinese Patent Application No. 201180052053.2.

First Office Action of Taiwanese Patent Application No. 100137461 issued Mar. 25, 2015.

Office Action of European Patent Application No. 11784529.7 issued May 12, 2015.

* cited by examiner

DIRECTIONS OF LINEAR LIGHT BEAM

Fig. 5

PROFILE MEASURING APPARATUS, METHOD FOR MANUFACTURING STRUCTURE, AND STRUCTURE MANUFACTURING SYSTEM

CROSS-REFERENCE TO RELATED APPLICATIONS

The present application claims priority from Japanese Patent Application No. 2010-240963, filed on Oct. 27, 2010, the disclosure of which is incorporated herein by reference in its entirety.

BACKGROUND

1. Field of the Invention

The present invention relates to a profile measuring apparatus, and a method for manufacturing a structure and a structure manufacturing system utilizing the profile measuring apparatus.

2. Description of the Related Art

Various techniques have been conventionally proposed for measuring surface profiles of objects such as industrial products and the like, and some of them are known for three-dimensionally measuring the profile of an object (a measuring object) by utilizing a contact-type measuring probe (see Japanese Patent Application Laid-Open No. 2010-160084, for example). In the profile measuring apparatus disclosed in Japanese Patent Application Laid-Open No. 2010-160084, the measuring probe retained on a gate-shaped frame is configured to be movable in X, Y, and Z directions with respect to the object.

SUMMARY

According to a first aspect of the present teaching, there is provided a profile measuring apparatus which measures a profile of an object including: a projection unit which projects a pattern on the object from a projection direction; a measurement unit, which is displaced at a difference position for the projection unit and takes an image of the pattern from a direction different from the projection direction to measure a position on a surface of the object based on an image data obtained with the taken image; an object-rotation unit which rotates the object in two directions; and a pattern-rotation unit which is connected to the projection unit so as to be able to rotate the pattern relative to the object-rotation unit.

According to a second aspect of the present teaching, there is provided a method for manufacturing a structure, including: producing the structure based on design information; obtaining profile information of the structure by arranging the produced structure onto a rotation unit which is rotatable in two directions, and by taking an image of a pattern from a direction different from a projection direction of the pattern, upon projecting the pattern onto the structure; and comparing the obtained profile information with the design information, wherein upon obtaining the profile information of the structure, the profile of the structure is measured by rotating a direction of the pattern projected onto the structure depending on the profile of the structure.

According to a third aspect of the present teaching, there is provided a structure manufacturing system which manufactures a structure, including: a processing apparatus which produces the structure; and the profile measuring apparatus according to the first aspect of the present teaching which measures a profile of the structure produced by the processing apparatus to obtain profile information of the structure.

According to a fourth aspect of the present teaching, there is provided a profile measuring apparatus which measures a profile of an object including: a projection unit which projects a pattern on the object from a projection direction; a measurement unit, which is displaced at a different position for the projection unit and takes an image of the pattern from a direction different from the projection direction to measure a position on a surface of the object based on an image data obtained with the taken image; an object-rotation unit which rotates the object in two directions; a pattern-rotation unit which is connected to the projection unit so as to be able to rotate the pattern relative to the object-rotation unit; and a profile information acquisition unit which is connected to the pattern-rotation unit and acquires a profile information of the object, wherein the pattern-rotation unit is configured to rotate the pattern relative to the object-rotation unit based on the profile information acquired by the profile information acquisition unit.

DESCRIPTION OF THE EMBODIMENTS

Hereinbelow, with reference to the accompanying drawings, explanations will be made with respect to the construction of a profile measuring apparatus in accordance with an embodiment of the present teaching. Further, the embodiment serves as a concrete explanation for a better understanding of the gist of the present teaching, and thus does not limits the present teaching thereto unless otherwise designated. Further, in order to make it easy to understand the characteristics, as a matter of convenience, the accompanying drawings utilized in the following explanations may possibly enlarge relevant parts to serve the purpose of illustration, and thus the dimensional ratio and the like of each component are not necessarily the same as those in reality.

Figure 1:
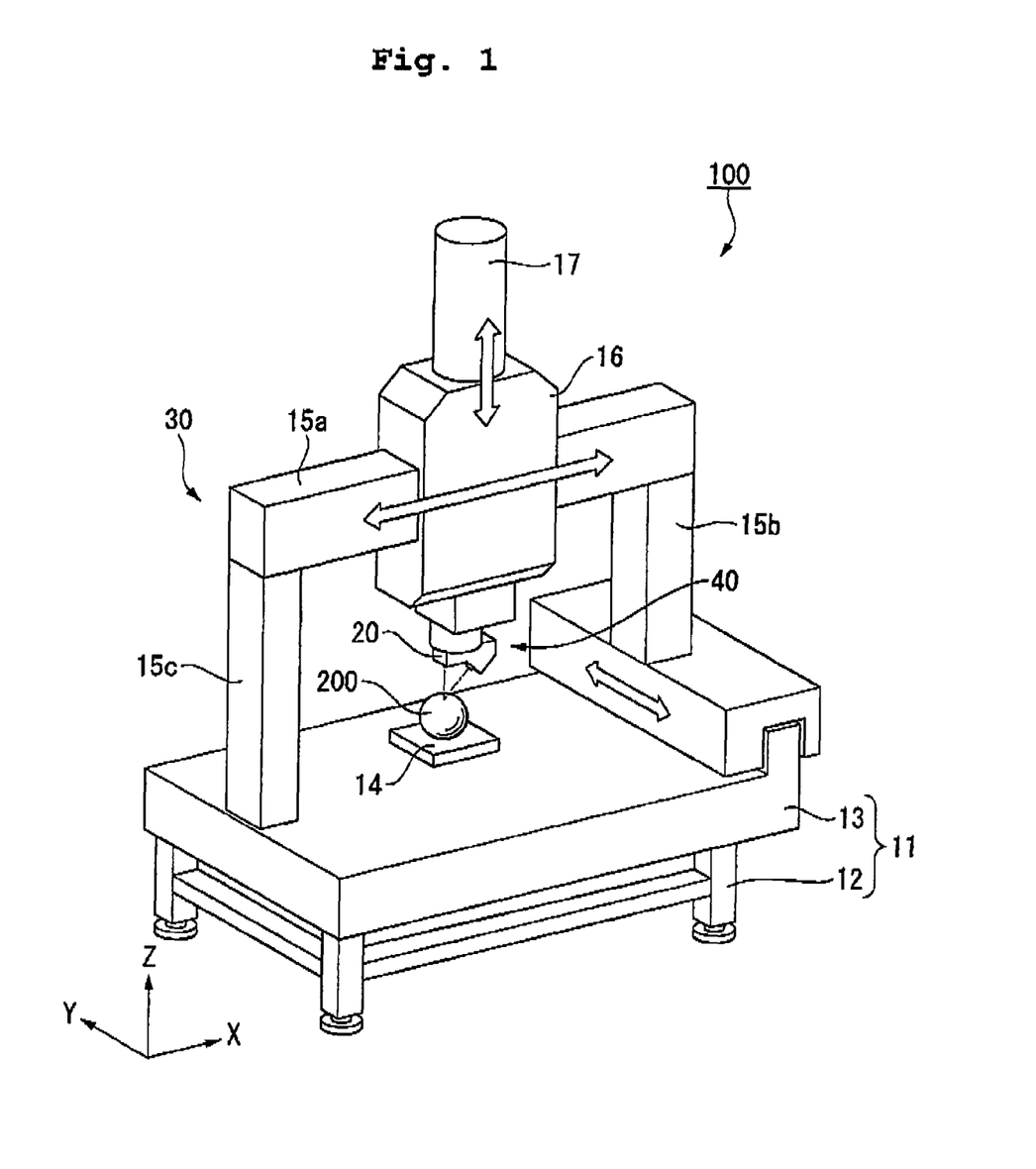
FIG. 1 is a perspective view showing a construction of a profile measuring apparatus.
Figure 2:
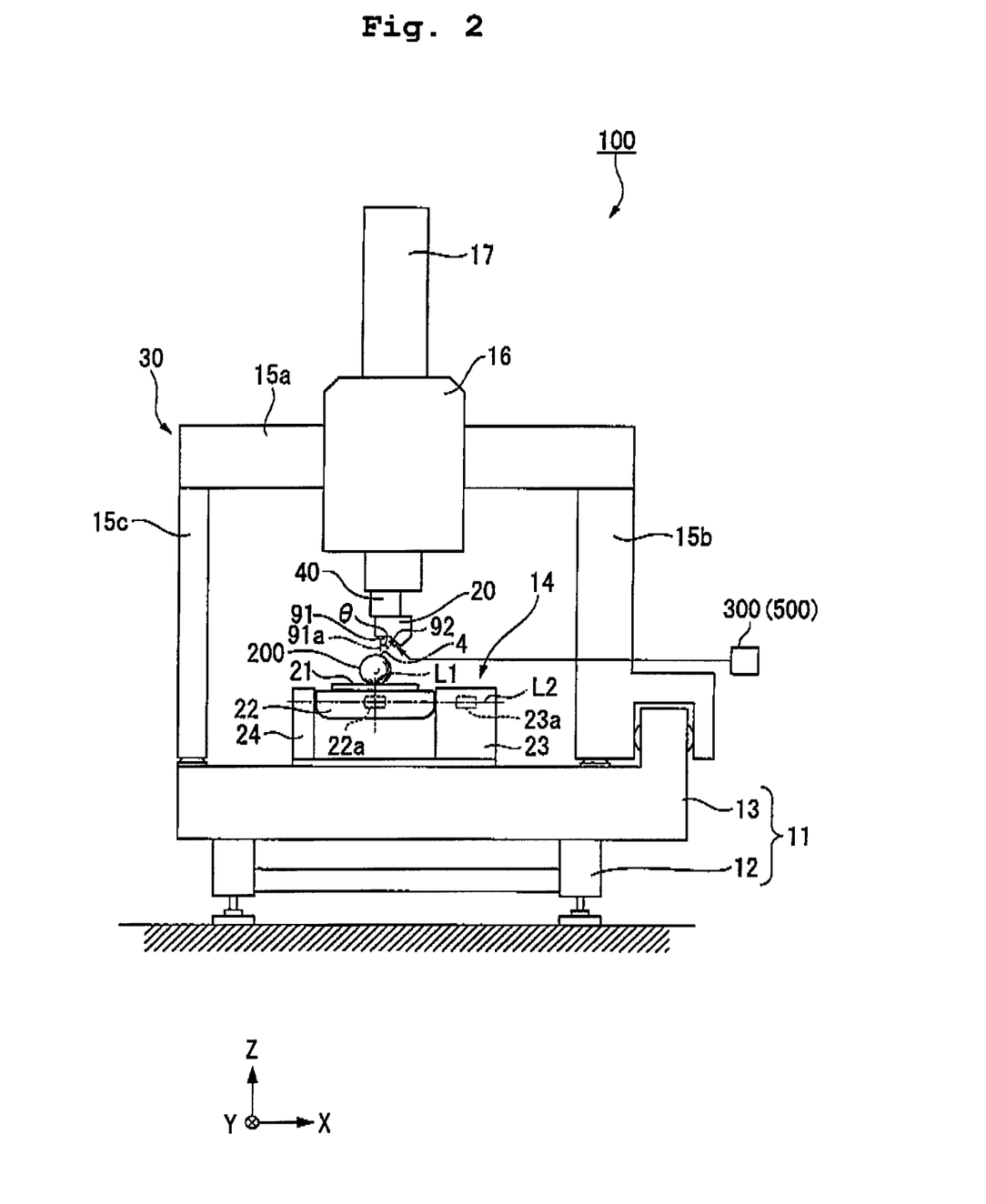
FIG. 2 is a side view showing the construction of the profile measuring apparatus.

FIG. 1 is a perspective view and FIG. 2 is a side view showing a constructional example of the embodiment with respect to the profile measuring apparatus of the present teaching. The profile measuring apparatus in accordance with the embodiment utilizes a light-section method to project a linear projection pattern formed of a linear light beam on the surface of an object, and take an image of the linear projection pattern projected on the object from a different angle with the projection direction each time the linear projection pattern scans the entire area of the object surface. Then, the apparatus utilizes the principle of triangulation and the like to calculate the height of the object surface from a reference plane according to each pixel of the linear projection pattern in a longitudinal direction based on the obtained image of the object surface, so as to find a three-dimensional profile of the object surface.

As shown in FIGS. 1 and 2, a profile measuring apparatus 100 has a main body 11, a tilting and rotating table 14, a sensor 20 for measuring the profile of an object, a movement section 30 for moving the sensor 20, and a rotation mechanism 40 for rotating the sensor 20 with respect to the movement section 30.

The main body 11 includes a mounting 12 and a surface plate 13 placed on the mounting 12. The mounting 12 serves to adjust the levelness of the whole profile measuring apparatus 100. The surface plate 13 is made of stone or cast iron, and its upper surface is kept in a horizontal position by the mounting 12. The tilting and rotating table 14 is placed on the upper surface of this surface plate 13.

Hereinbelow, a construction of the profile measuring apparatus 100 will be explained with an X-Y-Z coordinate system defined by three directions perpendicular to one another. Here, the X-Y plane defines a plane parallel to the upper surface of the surface plate 13. That is, the X direction defines one direction on the upper surface of the surface plate 13, the Y direction defines another direction perpendicular to the X direction on the upper surface of the surface plate 13, and the Z direction defines a direction perpendicular to the upper surface of the surface plate 13.

The tilting and rotating table 14 includes a rotating table 21 on which an object 200 is placed, a tilting table 22 in which the rotating table 21 is installed so that the rotating table 21 is rotatable about an axis of rotation L1 extending in a Z-axis direction vertical to the upper surface of the rotating table 21 (the direction from the sensor 20 toward the object 200), and supporting sections 23 and 24 which support the tilting table 22 to be rotatable about an axis of tilt L2 extending in an X-axis direction (the direction intersecting with the axis of rotation L1). The rotating table 21 is a circular plate-shaped member, and the flatness of its upper surface is defined at a high degree of accuracy.

The tilting table 22 has a rotating shaft driving motor 22a, which is embedded in the tilting table 22 and which drives the rotating table 21 to rotate about the axis of rotation L1. The rotating table 21 is coupled with the shaft of the rotating shaft driving motor 22a by a plurality of bolts inserted in a plurality of through holes (not shown) formed in the central portion of the rotating table 21.

Further, the supporting section 23 has a tilting shaft driving motor 23a, which is embedded in the supporting section 23 and which drives the tilting table 22 to rotate about the axis of tilt L2 so as to tilt the rotating table 21 at a predetermined tilt angle with respect to the horizontal plane.

In this manner, regarding the tilting and rotating table 14, it is possible to keep the object 200 placed on the rotating table 21 in an arbitrary attitude by rotating the rotating table 21 and tilting the tilting table 22. Further, the rotating table 21 is configured so that the rotating table is capable of fixing the object 200 without deviation even if the tilt angle of the tilting table 22 becomes steep.

The sensor 20 mainly includes an irradiation section 91 which irradiates a linear light to carry out light sectioning on the object 200 placed on the tilting and rotating table 14, and a detection section 92 which detects the surface of the object 200 on which a light-section plane (a light-section line) has appeared due to the irradiating of the linear light. Further, the sensor 20 is connected to a computation processing section 300 which measures the profile of a object based on the image data detected by the detection section 92. The computation processing section 300 is included in a controller 500 which controls the driving of the whole profile measuring apparatus 100.

The irradiation section 91 includes a cylindrical lens, a slit plate having a narrow strip-shaped notch (cutting) and the like (not shown) for receiving illumination light from a light source to generate an arc-like linear light beam 91a. As the light source, it is possible to utilize LED, a laser light source, SLD (Supper Luminescent Diode), and the like. In addition, it is possible to set up an inexpensive light source with LED. Further, because the laser light source is a point light source, it is possible to set up a linear light beam with little aberration. Moreover, because the laser light source excels in wavelength stability and has a small half bandwidth, filters with a small half bandwidth is available to cut stray light. Thereby, it is possible to reduce the influence of disturbance. Further, the Supper Luminescent Diode (SLD) has the property of a laser light source and, on top of that, its coherence is lower than that of laser light. Therefore, in the case of utilizing the SLD, it is possible to restrain speckles from occurring on the object surface. The detection section 92 serves to take an image of the linear light beam 91a projected on the surface of the object 200 from a direction different from the light irradiation direction of the irradiation section 91. Further, the detection section 92 includes an imaging lens, a CCD and the like (not shown) for taking the image of the object 200 each time the movement section 30 is driven to scan the linear light beam 91a at predetermined intervals, as will be described hereinafter. Further, the positions of the irradiation section 91 and the detection section 92 are defined so that an angle between the incident direction of the linear light beam 91a running on the surface of the object 200 with respect to the detection section 92 and the light irradiation direction of the irradiation section 91 becomes a predetermined angle $\theta$. In the embodiment, the predetermined angle $\theta$ is set, for example, at 45 degrees.

The image data of the object 200 taken by the detection section 92 is sent to the computation processing section 300, where a predetermined image computation processing is performed to calculate the height of the surface of the object 200 so that a three-dimensional profile (surface profile) of the object 200 is obtained. The computation processing section 300 calculates the height of the surface of the object 200 from a reference plane by utilizing the principle of triangulation, at each pixel of the light-section plane or the light-section line (the linear light beam 91a) extending in the longitudinal direction. In this process, the height of the surface of the object 200 from the reference plane is calculated, based on the positional information of the light-section plane (the light-section line) due to the linear light beam 91a that is deformed by the asperity of the object 200, so as to carry out the computation processing for finding a three-dimensional profile of the object 200.

The movement section 30 serves to let the linear light beam 91a scan the surface of the object 200 by moving the sensor 20 (the irradiation section 91) in a direction approximately orthogonal to the longitudinal direction of the linear light beam 91a projected on the object 200. In the profile measuring apparatus 100 in accordance with the embodiment, the movement section 30 moves the sensor 20 in a direction designated by a operator measuring the object profile, as will be described hereinafter. Further, the profile measuring apparatus 100 may as well be configured to detect the rotation angle of the sensor 20 and, based on the detection result, automatically calculate the movement direction of the movement section 30.

The movement section 30 is configured to have a gate-shaped frame 15 as its main part. Further, the surface plate 13 is configured so that an end portion thereof (on the right side in FIG. 2) doubles as a Y-axis guide to drive the gate-shaped frame 15 on the surface plate 13 in the Y-axis direction.

The gate-shaped frame 15 includes an X-axis guide 15a extending in the X-axis direction, a driving-side post 15b which is driven along the Y-axis guide of the surface plate 13, and a driven-side post 15c which is slid on the upper surface of the surface plate 13 in accordance with the driving of the driving-side post 15b.

A head member 16 is movable in the X-axis direction along the X-axis guide 15a of the gate-shaped frame 15. A Z-axis guide 17 which is movable in the Z-axis direction with respect to the head member 16 is inserted to the head member 16. The sensor 20 is installed on the lower end of the Z-axis guide 17.

In the case of utilizing a light-section method as the profile measuring apparatus 100 in accordance with the embodiment, it is desirable to align the linear light beam 91a irradiated from the irradiation section 91 of the sensor 20 on the object 200 in a direction perpendicular to the movement direction of the sensor 20 (to be referred to as the scanning direction hereinbelow). For example, in FIG. 2, in the case of setting the scanning direction of the sensor 20 to the Y-axis direction with respect to the object 200, it is desirable to align the linear light beam 91a along the X-axis direction. When the outgoing direction of the linear light beam 91a is set in such a relation with the sensor 20, then it is possible to carry out the scanning in which the entire range of the linear light beam 91a is used effectively in measuring, and thereby it is possible to optimally measure the profile of the object 200.

As described above, the sensor 20 in the profile measuring apparatus 100 in accordance with the embodiment is movable with respect to the object 200 by virtue of the movement section 30. Because the movement section 30 is configured to have the aforementioned gate-shaped frame 15 as its main part, the scanning direction of the linear light beam 91a irradiated from the irradiation section 91 of the sensor 20 installed in the movement section 30 is, in principle, confined to any one of the X direction, Y direction and Z direction with respect to the object 200.

Therefore, in the profile measuring apparatus 100 in accordance with the embodiment, the aforementioned rotation mechanism 40 is arranged between the Z-axis guide 17 and the sensor 20, whereby the sensor 20 is rotatable with respect to the movement section 30. By virtue of this, it becomes possible for the profile measuring apparatus 100 to align the linear light beam 91a in a direction perpendicular to the scanning direction of the sensor 20 as described hereinbefore.

Figure 3A:
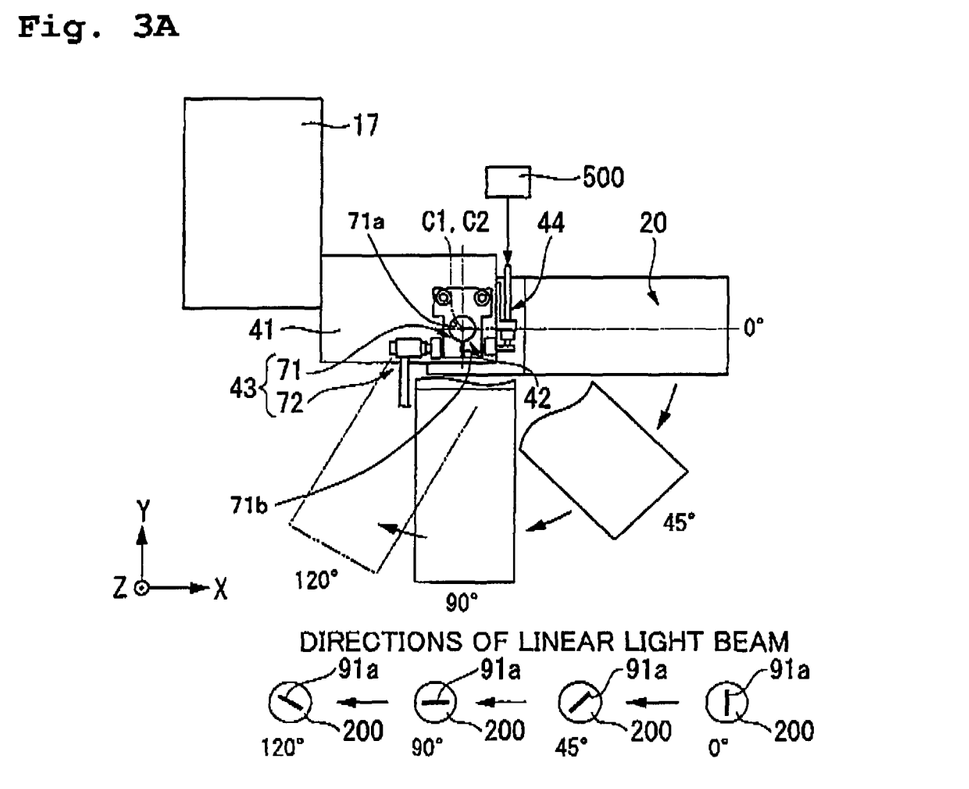
FIGS. 3A and 3B are diagrams showing a construction of relevant parts of a rotation mechanism.
Figure 3B:
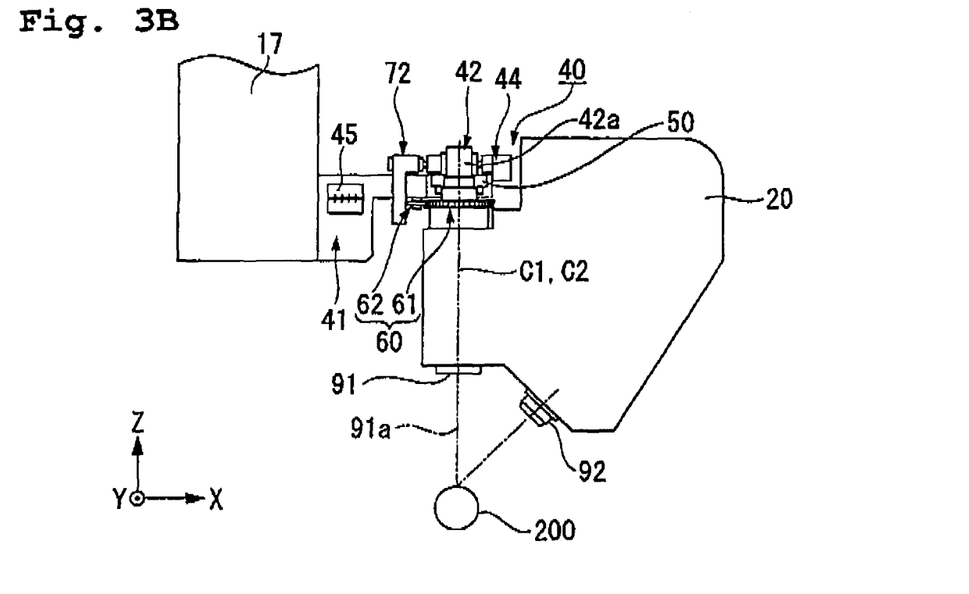

FIGS. 3A and 3B are diagrams showing a construction of relevant parts of the rotation mechanism 40, where FIG. 3A is a top view and FIG. 3B is a side view. As shown in FIGS. 3A and 3B, the rotation mechanism 40 has an installation section 41, a rotation section 42, a lock section 43, and a lock state determination section 44. The sensor 20 is installed at one end of a rotating shaft 42a provided in the rotation section 42. In the embodiment, the sensor 20 is installed on the rotating shaft 42a so that a central axis of rotation C1 with respect to the rotating shaft 42a coincide with a central axis C2 of the linear light beam 91a irradiated from the irradiation section 91.

The rotation section 42 has the rotating shaft 42a which holds or retains the sensor 20 to be rotatable with respect to the movement section 30, and a rotation restriction section 60 which temporarily restricts the rotation of the rotating shaft 42a each time the rotating shaft 42a rotates through a predetermined angle.

The rotation restriction section 60 includes teeth-shaped grooves 61 formed in the outer circumference of the rotating shaft 42a, and a ball plunger 62 provided in the installation section 41. The teeth-shaped grooves 61 are formed in the outer circumference of the rotating shaft 42a at intervals such as each through 7.5°. Based on such configuration, because the ball plunger 62 engages teeth-shaped grooves 61 each time the rotating shaft 42a rotates through 7.5°, a load comes to act on the rotation of the rotating shaft 42a so as to allow an operator to have a click feeling on the hand. Therefore, it is possible for the operator to easily figure out the rotation angle of the rotating shaft 42a according to the number of clicks sensed by the hand.

Further, the installation section 41 is provided with a rotation indicator 45 which indicates the rotation angle of the rotating shaft 42a. The rotation indicator 45 is provided with a scale, for example, to display a value of the rotation angle in degrees such as 7.5°, 15°, 22.5° and the like each time the rotating shaft 42a rotates through 7.5° as described hereinbefore. By virtue of this, it is possible for the operator measuring the object profile to simply and reliably set the rotation angle of the rotating shaft 42a to a predetermined value by visually checking the degrees on the scale of the rotation indicator 45.

As shown in FIG. 3A, in the rotation mechanism 40, by virtue of the rotation of the rotating shaft 42a, the sensor 20 can move in the range between 0° and 120°. When the sensor 20 is positioned at 0°, then the irradiation section 91 and the detection section 92 are located along the X-axis direction. Further, when the sensor 20 is positioned at 90°, then the irradiation portion 91 and the detection portion 92 are located along the Y-axis direction. When the sensor 20 is rotated, then, as shown in FIG. 3A, the linear light beam 91a irradiated on the surface of the object 200 changes its direction.

In the profile measuring apparatus 100 in accordance with the embodiment, because the central axis of rotation with respect to the rotating shaft 42a is in coincidence with the central axis of the linear light beam 91a irradiated from the irradiation section 91, the measuring start position of the linear light beam 91a (measuring center position) is prevented from deviation in the X-Y plane after rotation with respect to the object 200. In this manner, because the measuring start position of the linear light beam 91a does not deviate in the X-Y plane with respect to the object 200 after rotation of the rotating shaft 42a, even in the case of changing the direction of the sensor 20 at an end portion of the object 200, the linear light beam 91a is prevented from being irradiated onto positions away from the surface of the object 200. Further, in the profile measuring apparatus 100 in accordance with the embodiment, because the linear light beam 91a is irradiated from the normal direction to the measuring surface of the object 200, the measurement accuracy is improved and, at the same time, it is possible to orient the extending direction of the linear light beam 91a to a direction perpendicular to the scanning direction by making the central axis of the linear light beam 91a coincide with the central axis of rotation of the rotation mechanism 40. Further, when the measuring area of the object is large in width, etc., it is sometimes desired to orient a part of the linear light beam 91a other than the center to the measuring area. In such a case, in addition to rotation, a displacement mechanism which moves the sensor 20 in directions parallel to the X direction and the Y direction may be provided so as to displace the sensor 20 such that the extending direction of the linear light beam 91a change while retaining a part of the irradiation position of the linear light beam 91a irradiated on the object. Thereby, it is possible to orient the linear light beam 91a to a desired position and direction.

The lock section 43 is fixed on the installation section 41. The lock section 43 includes a fixing portion 73 into which the rotating shaft 42a is inserted and a lock lever 72 which is provided on the fixing portion 71. The rotating shaft 42a is smoothly rotatable with respect to the installation portion 41 by a bearing 50. In the fixing portion 71, there are formed a through hole 71a through which the rotating shaft 42a is inserted and an incision 71b which is cut from the lower end of the through hole 71a and extends in the Y direction as shown in FIG. 3A. When the lock lever 72 is moved downward (in the −Z direction), for example, a force is exerted on the fixing portion 71 in such a direction that the incision 71b is narrowed in width, thereby diminishing the diameter of the through hole 71a. Along with this, the rotating shaft 42a is tightened up. In this manner, the fixing portion 71 fixes the rotating shaft 42a so that it can not rotate with respect to the installation section 41. On the other hand, when the lock lever 72 is moved upward (in the +Z direction), the force exerted on the fixation portion 71 in the direction to narrow the width of the incision 71b is removed. Along with this, the diameter of the through hole 71a is restored. Thereby, the rotating shaft 42a is rotatable with respect to the installation portion 41 without being tightened up.

Figure 4A:
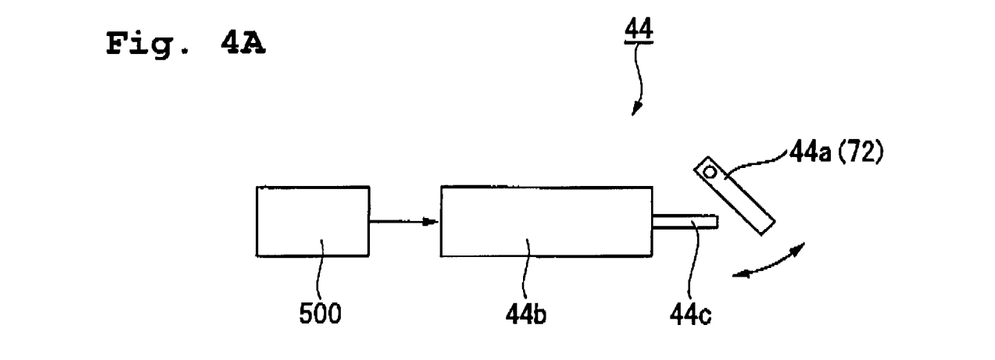
FIGS. 4A and 4B are diagrams showing a construction of relevant parts of a lock state determination section.
Figure 4B:
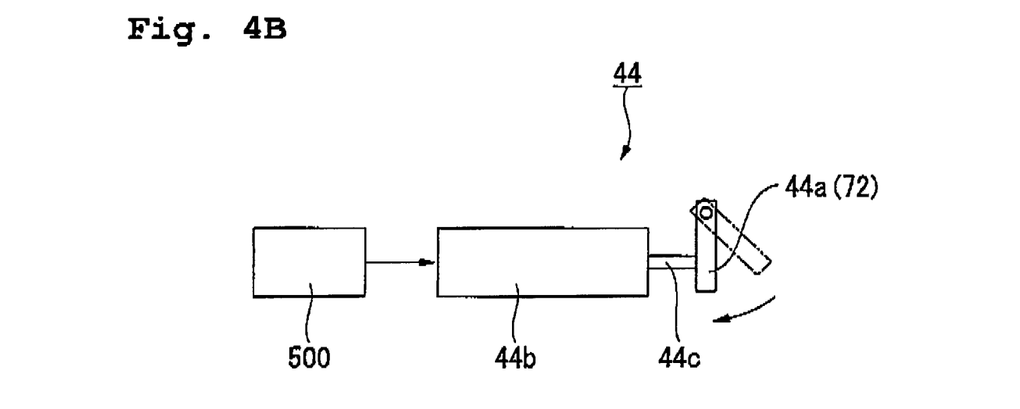

FIGS. 4A and 4B are diagrams showing a construction of relevant parts of the lock state determination section 44, where FIG. 4A is a diagram showing a state in which the lock state determination section 44 detects an unlocked state and FIG. 4B is a diagram showing a state in which the lock state determination section 44 detects a locked state. As shown in FIG. 4A, the lock state determination section 44 includes a sensor detection plate 44a fixed at the end of the lock lever 72, and a touch sensor 44b for contacting with the sensor detection plate 44a. When the lock lever 72 has moved to a position at which it is possible to preferably tighten up the rotating shaft 42a, the sensor detection plate 44a comes to contact with the touch sensor 44b. The touch sensor 44b is electrically connected to the controller 500 which carries out control of driving the whole profile measuring apparatus 100.

The touch sensor 44b has a contact member 44c arranged at a predetermined position, to be contactable with the sensor detection plate 44a. The contact member 44c is configured so that the contact member 44c can be pressed by the sensor detection plate 44a.

As shown in FIG. 4B, the contact member 44c notifies the controller 500 of an ON signal when it is pressed up to a predetermined position. On the other hand, the contact member 44c notifies the controller 500 of an OFF signal when it is not pressed up to the predetermined position. Here, the case in which the ON signal is notified means that the lock lever 72 sufficiently tightens up the rotating shaft 42a, whereas the case in which the OFF signal is notified means that the lock lever 72 does not sufficiently tighten up the rotating shaft 42a.

When the ON signal is notified, the controller 500 displays information indicating a satisfactory lock state of the rotating shaft 42a (such as "OK" and the like) on a display (not shown) of the profile measuring apparatus 100. On the other hand, when the OFF signal is notified, the controller 500 displays information indicating a dissatisfactory lock state of the rotating shaft 42a (such as "NO" and the like) on the display (not shown) of the profile measuring apparatus 100. This prevents problems from occurring such as profile measurement is started for the object 200 when the rotating shaft 42a remains in a dissatisfactory lock state, etc.

Based on such configuration, the profile measuring apparatus 100 becomes capable of irradiating the linear light beam 91a from the irradiation portion 91 toward the object 200 in a predetermined direction while no looseness may occur in the sensor 20.

Next, explanations will be made hereinbelow with respect to a method for measuring the profile of the object 200 as a behavior of the profile measuring apparatus 100. First, the operator measuring the object profile places the object 200 on the rotating table 21. Then, the rotation mechanism 40 rotates the sensor 20 with respect to the movement section 30 so that the linear light beam 91a to be irradiated on the object 200 be oriented in a predetermined direction.

Referring to the number of clicks sensed with the rotation restriction portion 60 and/or the degrees on the scale of the aforementioned rotation indicator 45 provided in the rotation mechanism 40, the operator measuring the object profile can easily set the rotation angle of the rotating shaft 42a (the sensor 20) to a predetermined value.

Further, when the sensor 20 is rotated, it is possible to keep irradiating the object 200 with the linear light beam 91a from the irradiation portion 91. In such a case, the operator measuring the object profile can more easily set the rotation angle for the sensor 20 by using the linear light beam projected on the object 200 as a guide and reference.

After rotating the rotating shaft 42a through a predetermined angle, the operator measuring the object profile utilizes the lock portion 43 to fix the rotating shaft 42a. In particular, the operator measuring the object profile can tighten up the rotating shaft 42a by moving the lock lever 72 downward to fix the rotating shaft 42a reliably. When the rotating shaft 42a moves while the movement portion 30 is moving the sensor 20 at the time of the profile measuring as described below, there is a fear that the linear light beam 91a irradiated on the object 200 from the irradiation portion 91 of the sensor 20 may deviate in position. By virtue of the lock portion 43, it is possible to avoid such a problem.

In the embodiment, the operator measuring the object profile utilizes an input portion (not shown) to input the rotation angle of the rotating shaft 42a set in the manner as described above. The profile measuring apparatus 100 drives the movement section 30 to move the sensor 20 (the irradiation section 91) in a direction approximately orthogonal to the longitudinal direction of the linear light beam 91a irradiated on the object 200, so as to scan the surface of the object 200 by the linear light beam 91a.

When the linear light beam 91a is irradiated on the object 200, because the light-section plane (the light-section line) due to the linear light beam 91a appears on the surface of the object 200, the detection section 92 takes an image of the object 200 (on which the light-section plane has appeared) each time the linear light beam 91a scans at predetermined intervals. At the time, the image data of the object 200 taken by the detection section 92 is sent to the computation processing section 300.

From the image data of the object 200 obtained in this manner, the computation processing section 300 can measure the three-dimensional profile of the object 200, based on the positional information of the light-section plane (the light-section line) due to the linear light beam 91a deformed according to the asperity of the object 200. Then, the height of the surface of the object 200 from a reference plane is calculated by utilizing the principle of triangulation according to each pixel of the light-section plane or the light-section line (the linear light beam 91a) extending in the longitudinal direction.

In the profile measuring apparatus 100 in accordance with the embodiment, the sensor 20 is rotated by the aforementioned rotation mechanism 40. Therefore, it is possible to align the linear light beam 91a in a direction perpendicular to the scanning direction of the sensor 20 even if the scanning direction is an oblique direction combining the X direction and the Y direction. Thereby, it is possible to measure the optimal range for various objects 200.

Further, because the sensor 20 carries out scanning in a direction perpendicular to the length direction of the linear light beam 91a, it is possible to effectively utilize the whole range of the linear light beam 91a, reduce the number of scans over the measuring region, and carry out the profile measuring in a short time.

Further, because the central axis of rotation with respect to the rotating shaft 42a coincides with the central axis of the linear light beam 91a irradiated from the irradiation section 91, the coordinate of the center position of the linear light beam 91a after rotation will not change. Therefore, it is possible to calculate the coordinate values of the linear light beam 91a after rotation from the rotation angle alone. Thereby, when utilizing the linear light beam 91a after rotation to carry out the profile measuring, it is possible to simplify the computation process by easily carrying out a coordinate correction.

Further, because the central axis of rotation C1 with respect to the rotating shaft 42a coincides with the central axis C2 of the linear light beam 91a irradiated from the irradiation section 91, the measuring start position of the linear light beam 91a will not deviate in the X-Y plane with respect to the object 200 after rotation. Therefore, it is possible to measure the profile of the object 200 in the optimal range and from various directions in a short time by rotating the sensor 20 in various directions.

Further, because the measuring start position of the linear light beam 91a does not deviate in the X-Y plane with respect to the object 200 after rotation, even if the sensor 20 is rotated at the end portion of the object 200, the linear light beam 91a will not come off the surface of the object 200. Thus, there will be no necessity to readjust the position of the sensor 20 with respect to the object 200. Further, because the rotation mechanism for the sensor 20 is separated from the tilting and rotating table 14 via the highly stable surface plate 13, it is possible to achieve a high-precision measurement without superimposing a rotation error of the sensor 20 on the error due to tilting and rotating the object 200.

Hereinabove, the explanations were made with respect to a construction of the present teaching in accordance with an embodiment. However, the present teaching is not limited to this, but may possibly be changed as appropriate without departing from its spirit or scope. For example, in the above embodiment, an example was given in the explanations with the case that the movement range of the sensor 20 was from 0° to 120° by the rotation mechanism 40. However, the movement range of the sensor 20 may as well be set from 0° to 180°. According to this configuration, because the orientation of the linear light beam 91a changes in the range between 0° and 180°, it is possible to measure the profile of the object 200 in a wider range.

Figure 5:
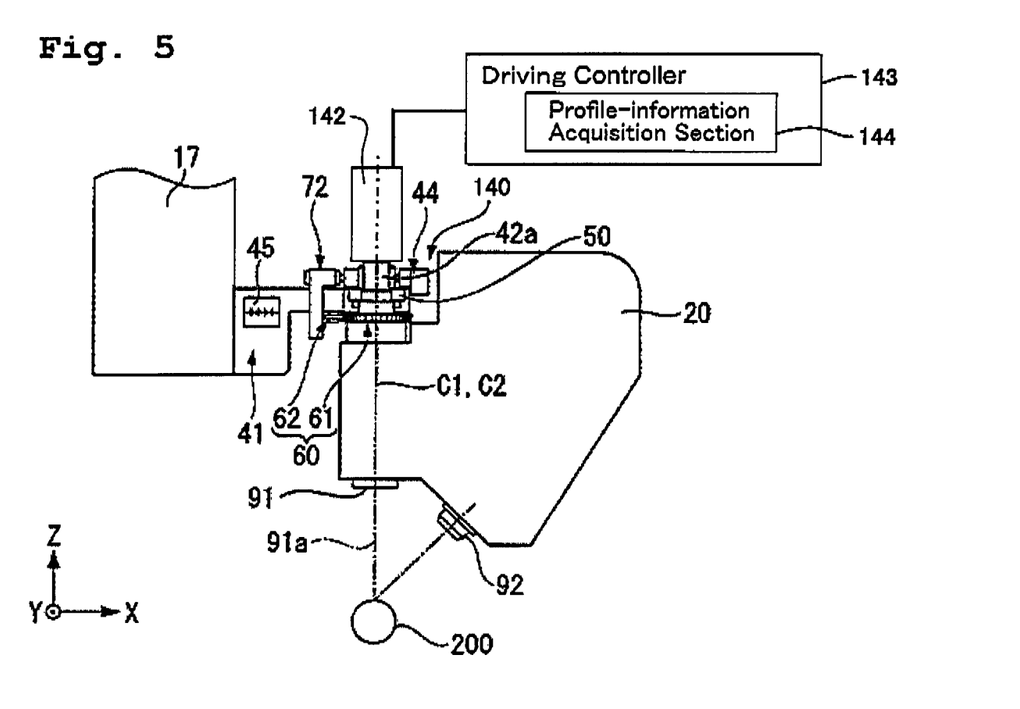
FIG. 5 shows a construction of relevant parts of a rotation mechanism.

In the above described embodiment, the operator measuring the object profile rotates the sensor 20 by using the rotation mechanism 40 with respect to the movement section 30 so that the linear light beam 91a irradiated onto the object 200 is directed in a predetermined direction. However, the present teaching is not limited to such a configuration. For example, as shown in FIG. 5, the profile measuring apparatus 100A in accordance with the present teaching may have an automatic rotation mechanism 140 which automatically changes the orientation of the linear light beam 91a based on the profile of the object 200, instead of the rotation mechanism 40 which is operated manually. Similar to the rotational mechanism 40, the automatic rotation mechanism 140 includes the installation section 41, the rock section 43, and the lock state determination section 44. An explanation of these components are omitted. Further, the automatic rotation mechanism 140 includes a driving section 142 which has the rotating shaft 42a holding or retaining the sensor 20 to be rotatable with respect to the movement section 30 and which rotates the sensor 20 around the rotating shaft 42a with respect to the movement section 30, and a driving controller 143 which controls the operation of the driving section 142. The driving section 142 may be constructed of a motor such as a stepping motor. The driving controller 143 has a profile-information acquisition section 144 which acquires and stores a profile information of the object 200. The profile-information acquisition section 144 may acquire the profile information from, for example, a CAD data of the object 200. Alternatively, the profile-information acquisition section 144 may acquire the profile information of the object 200 via a so-called teaching operation. That is, the profile of the object 200 may be measured roughly in advance, for example during the teaching operation. The driving controller 143 calculates a preferable orientation of the linear line light 91a that is preferable to the profile measurement, based on the profile information of the object 200 acquired by the profile-information acquisition section 144. Then the driving controller 143 controls the driving section 142 to rotate the sensor 20 with respect to the moving section 30 so that the linear light beam 91a is irradiated along the calculated orientation. As described above, when the profile measurement apparatus 100A includes the automatic rotation mechanism 140 instead of the rotation mechanism 40 of the profile measurement apparatus 100, there is no need for the operator measuring the object profile to change or adjust the orientation of the linear light beam 91a in accordance with the profile of the object 200. In the profile measurement apparatus 100A, it is possible to adjust the orientation of the linear light beam 91a automatically based on the profile information of the object 200 that is acquired by the profile-information acquisition section 144. It is possible to shorten the time required for adjusting the orientation of the linear light beam 91a, thereby making it possible to shorten the time required for measuring the profile of the object 200.

The above described profile measurement apparatus 100A includes the automatic rotation mechanism 140 instead of the manual rotation mechanism 40. However, the present teaching is not limited to such a configuration. For example, a profile measuring apparatus in accordance with the present teaching may include both of the automatic rotation mechanism 140 and the manual rotation mechanism 40. It is not necessarily indispensable that the profile measuring apparatus 100A has the rotation restriction section 60 or rotation indicator 45. Further, it is not necessarily indispensable that the profile measuring apparatus 100A has the rock section 43 or the lock state determination section 44 of the profile measuring apparatus 100. For example, when the driving section 142 has an electromagnetic break, the electromagnetic break can function as the rock section 43. Further, the driving controller 143 which controls the electromagnetic break can function as the rock state determination section 44.

In the above explanation, the irradiation section 91 generates the linear light beam 91a by causing the light radiated from the light source to pass via the slit plate (not shown), etc. However, the present teaching is not limited to such a configuration. For example, instead of the slit plate, a liquid crystal panel having a plurality of liquid crystal elements arranged in a 2D-matrix array can be used for generating the linear light beam 91a. In this case, it is possible to generate an arbitrary slit pattern on a surface of the liquid crystal panel by adjusting the voltage applied to each of the liquid crystal elements. In this case, it is possible to change the orientation of the linear light beam 91a by changing the orientation of the slit pattern generated on the surface of the liquid crystal panel.

The profile measuring apparatus in accordance with the present teaching may include the irradiation section 91 which generates the linear light beam 91a by using the above described liquid crystal panel, and in this case, the profile measuring apparatus may change the orientation of the linear light beam 91a based on the profile information of the object 200.

Next, explanations will be made with respect to a structure manufacturing system provided with the measuring apparatus (profile measuring apparatus) described hereinabove.

Figure 6:
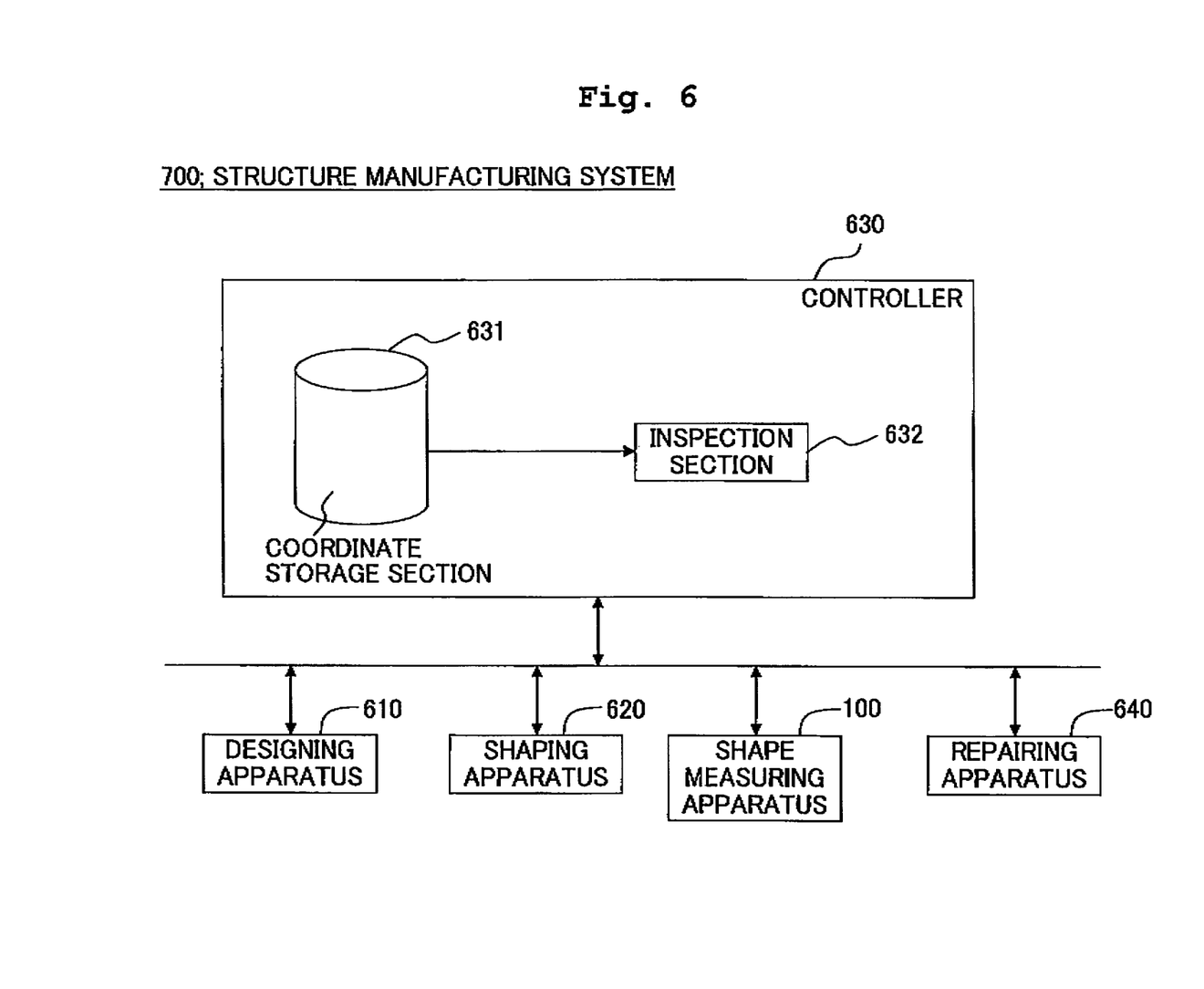
FIG. 6 is a block diagram of a structure manufacturing system 700.

FIG. 6 is a block diagram of a structure manufacturing system 700. The structure manufacturing system is for producing at least a structure from at least one material such as a gear, a turn turbine blade and so on, and inspecting the structure by the profile measuring apparatus 100. The structure manufacturing system 700 of the embodiment includes the profile measuring apparatus 100 as described hereinabove in the embodiment, a designing apparatus 610, a shaping apparatus 620, a controller 630 (inspection apparatus), and a repairing apparatus 640. The controller 630 includes a coordinate storage section 631 and an inspection section 632.

The designing apparatus 610 creates design information with respect to the profile of a structure and sends the created design information to the shaping apparatus 620. Further, the designing apparatus 610 causes the coordinate storage section 631 of the controller 630 to store the created design information. The design information includes information indicating the coordinates of each position of the structure.

The shaping apparatus 620 produces the structure based on the design information inputted from the designing apparatus 610. The shaping process by the shaping apparatus 620 includes such as casting, forging, cutting, and the like. The profile measuring apparatus 100 measures the coordinates of the produced structure (measuring object) and sends the information indicating the measured coordinates (profile information) to the controller 630.

The coordinate storage section 631 of the controller 630 stores the design information. The inspection section 632 of the controller 630 reads out the design information from the coordinate storage section 631. The inspection section 632 compares the information indicating the coordinates (profile information) received from the profile measuring apparatus 100 with the design information read out from the coordinate storage section 631. Based on the comparison result, the inspection section 632 determines whether or not the structure is shaped in accordance with the design information. In other words, the inspection section 632 determines whether or not the produced structure is nondefective. When the structure is not shaped in accordance with the design information, then the inspection section 632 determines whether or not the structure is repairable. If repairable, then the inspection section 632 calculates the defective portions and repairing amount based on the comparison result, and sends the information indicating the defective portions and the information indicating the repairing amount to the repairing apparatus 640.

The repairing apparatus 640 performs processing of the defective portions of the structure based on the information indicating the defective portions and the information indicating the repairing amount received from the controller 630.

Figure 7:
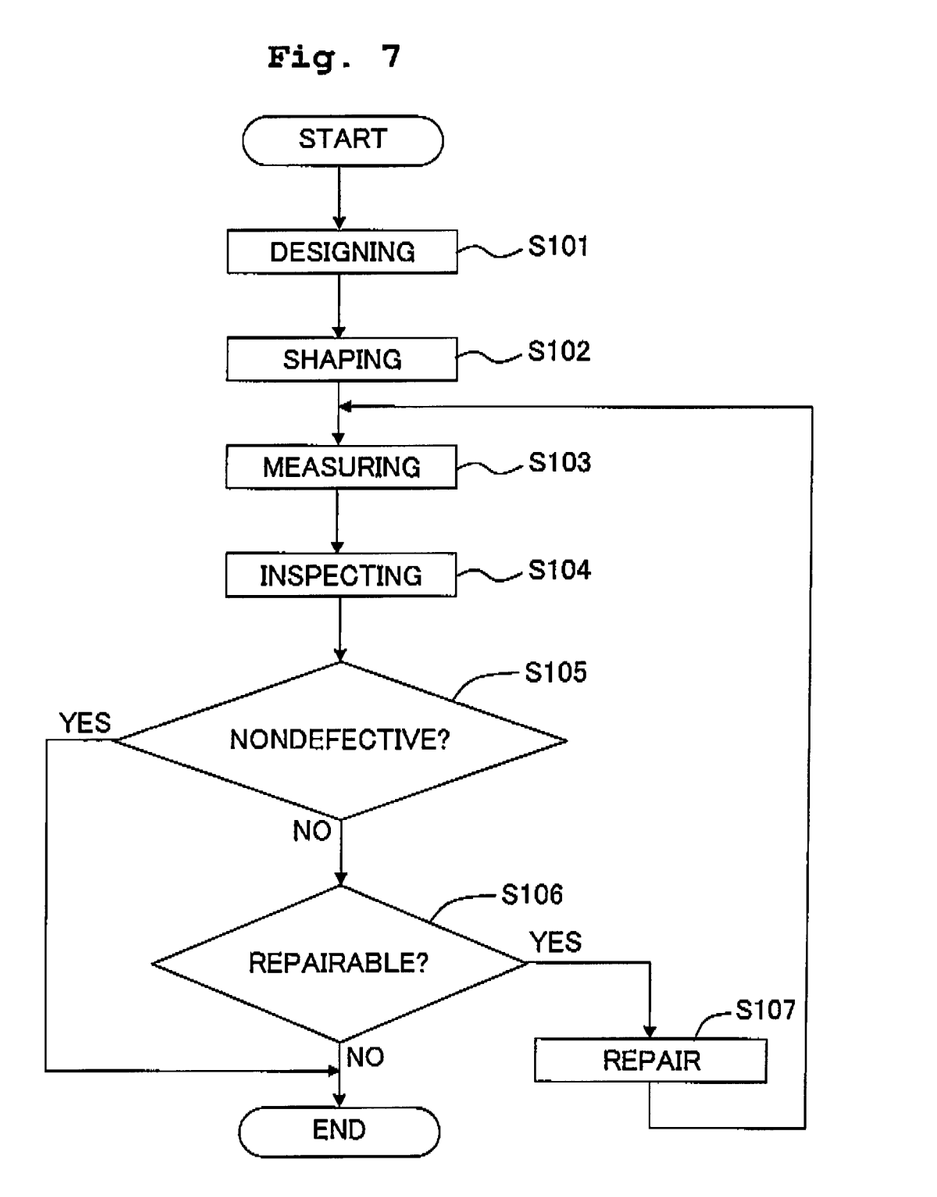
FIG. 7 is a flowchart showing a processing flow of the structure manufacturing system 700.

FIG. 7 is a flowchart showing a processing flow of the structure manufacturing system 700. With respect to the structure manufacturing system 700, first, the designing apparatus 610 creates design information with respect to the profile of a structure (step S101). Next, the shaping apparatus 620 produces the structure based on the design information (step S102). Then, the profile measuring apparatus 100 measures the produced structure to obtain the profile information thereof (step S103). The produced structure is arranged onto the tilting and rotating table 14, and the image of the pattern is taken by detection section 92 from the direction different from the projection direction of the pattern. While the profile information of the structure is obtained, the profile of the structure is measured by rotating a direction of the pattern projected onto the structure depending on the profile of the structure. Then, the inspection section 632 of the controller 630 inspects whether or not the structure is produced truly in accordance with the design information by comparing the profile information obtained from the profile measuring apparatus 100 with the design information (step S104).

Then, the inspection portion 632 of the controller 630 determines whether or not the produced structure is nondefective (step S105). When the inspection section 632 has determined the produced structure to be nondefective ("YES" at step S105), then the structure manufacturing system 700 ends the process. On the other hand, when the inspection section 632 has determined the produced structure to be defective ("NO" at step S105), then it determines whether or not the produced structure is repairable (step S106).

When the inspection portion 632 has determined the produced structure to be repairable ("YES" at step S106), then the repair apparatus 640 carries out a reprocessing process on the structure (step S107), and the structure manufacturing system 700 returns the process to step S103. When the inspection portion 632 has determined the produced structure to be unrepairable ("NO" at step S106), then the structure manufacturing system 700 ends the process. With that, the structure manufacturing system 700 finishes the whole process shown by the flowchart of FIG. 7.

With respect to the structure manufacturing system 700 of the embodiment, because the profile measuring apparatus 100 in the embodiment can correctly measure the coordinates of the structure, it is possible to determine whether or not the produced structure is nondefective. Further, when the structure is defective, the structure manufacturing system 700 can carry out a reprocessing process on the structure to repair the same.

Further, the repairing process carried out by the repairing apparatus 640 in the embodiment may be replaced such as to let the shaping apparatus 620 carry out the shaping process over again. In such a case, when the inspection section 632 of the controller 630 has determined the structure to be repairable, then the shaping apparatus 620 carries out the shaping process (forging, cutting, and the like) over again. In particular for example, the shaping apparatus 620 carries out a cutting process on the portions of the structure which should have undergone cutting but have not. By virtue of this, it becomes possible for the structure manufacturing system 700 to produce the structure correctly.

In the above embodiment, the structure manufacturing system 700 includes the profile measuring apparatus 100, the designing apparatus 610, the shaping apparatus 620, the controller 630 (inspection apparatus), and the repairing apparatus 640. However, present teaching is not limited to this configuration. For example, a structure manufacturing system in accordance with the present teaching may include at least the shaping apparatus and the profile measuring apparatus.

As described above, there are also noncontact measuring probes utilizing a light-section method or an optical cutting method other than the measuring probes of the aforementioned contact type. Such optical measuring probes project a predetermined projection pattern (such as slit lights and stripes) on the object and take an image of the object to calculate the height of each image position (each pixel) from a reference plane from the obtained image, so as to measure a three-dimensional surface profile of the object. Hence, for cases of combining an optical measuring probe with the gate-shaped frame disclosed in the aforementioned Japanese Patent Application Laid-Open No. 2010-160084, it is desired to provide a new apparatus capable of carrying out an optimal measurement for various objects.

In order to meet the above need, an object of the present teaching is to provide a profile measuring apparatus which can still carry out an optimal measurement for various objects even with the structure of furnishing the gate-shaped frame with an optical measuring probe, and a method for manufacturing a structure and a structure manufacturing system utilizing such kind of profile measuring apparatus.

According to the present teaching, it is possible to carry out an optimal measurement for various objects even with the structure of furnishing the gate-shaped frame with an optical measuring probe.

What is claimed is:

1. A profile measuring apparatus which measures a profile of an object comprising:
    a sensor unit including:
    a projection unit configured to project a pattern on the object from a projection direction; and
    a detection unit configured to take an image of the pattern to obtain image data for detecting the pattern irradiated on the object;
    an object-rotation unit which rotates the object in two directions; and
    a sensor-rotation unit which is connected to the projection unit so as to be able to synchronously rotate the projection unit with the detection unit.

2. The profile measuring apparatus according to claim 1, wherein the object-rotation unit includes a tilting mechanism configured to change a tilt angle of the object relative to the projected direction of the pattern about a tilting, and a rotating mechanism which is provided with the object-rotation unit, has a rotational axis intersecting with the tilting axis, and rotates the object about the rotational axis with respect to the projection section.

3. The profile measuring apparatus according to claim 2 further comprising a movement unit which is connected to the projection unit and moves a projected position of the pattern projected from the projection section,
    wherein the detection unit takes the image of the pattern from the direction different from the projected direction of the pattern by the projection unit each time the projected position of the pattern changes so that the detection unit measures the position of the object with respect to a portion of the object on which the pattern is projected, based on the image data.

4. The profile measuring apparatus according to claim 1, wherein the sensor-rotation unit rotates the projection unit so that a direction of the pattern is changed, upon retaining a part of irradiated position of the pattern projected on the object.

5. The profile measuring apparatus according to claim 1, further comprising a computation processing portion which is provided with the sensor unit and measures the profile of the object based on the image data obtained from the detection portion,
    wherein the sensor-rotation unit rotates the pattern by rotating the projection unit and the detection portion as a unit.

6. The profile measuring apparatus according to claim 1, wherein the pattern projected from the projection unit is a linear pattern, and the sensor-rotation unit rotates the projection unit with a central axis of the linear pattern as a rotation center.

7. The profile measuring apparatus according to claim 1, further comprising a rotation indicator which is provided with the sensor-rotation unit and indicates a rotation angle of the pattern.

8. The profile measuring apparatus according to claim 4, further comprising a rotation restriction portion which is provided with the sensor-rotation unit and latches a rotation of the projection section at each predetermined angular interval.

9. The profile measuring apparatus according to claim 5, further comprising a rotation restriction portion which is provided with the sensor-rotation unit and latches a rotation of the projection section at each predetermined angular interval.

10. The profile measuring apparatus according to claim 3, wherein the movement unit has a movement mechanism of a gate-shaped structure which is arranged to stride over the tilting mechanism and the rotating mechanism.

11. The profile measuring apparatus according to claim 5, further comprising a lock which is provided with the sensor-rotation unit and locks a rotation of the projection unit and the detection unit.

12. The profile measuring apparatus according to claim 8, further comprising a lock which is provided with the sensor-rotation unit and locks a rotation of the projection unit and the detection unit.

13. The profile measuring apparatus according to claim 9, further comprising a lock which is provided with the sensor-rotation unit and locks a rotation of the projection unit and the detection unit.

14. The profile measuring apparatus according to claim 11, further comprising a determination portion which is provided with the sensor-rotation unit and determines a locking state of the lock.

15. The profile measuring apparatus according to claim 12, further comprising a determination portion which is provided with the sensor-rotation unit and determines a locking state of the lock.

16. The profile measuring apparatus according to claim 13, further comprising a determination portion which is provided with the sensor-rotation unit and determines a locking state of the lock.

17. A method for manufacturing a structure, comprising:
    producing the structure based on design information;
    obtaining profile information of the structure by arranging the produced structure onto a rotation unit which is rotatable in two directions, and by taking an image of a pattern from a direction different from a projection direction of the pattern, upon projecting the pattern onto the structure; and
    comparing the obtained profile information with the design information,
    wherein upon obtaining the profile information of the structure, the profile of the structure is measured by rotating a direction of the pattern projected onto the structure depending on the profile of the structure.

18. The method for manufacturing the structure according to claim 17, wherein upon rotating the direction of the pattern, a projection unit which projects the pattern and a detection unit which is displaced at a difference position for the projection unit and takes an image of the pattern to obtain an image data for detecting the pattern irradiated on the structure are rotated as a unit.

19. The method for manufacturing the structure according to claim 18 further comprising reprocessing the structure based on the comparison result.

20. The method for manufacturing the structure according to claim 19, wherein reprocessing the structure includes producing the structure over again.

21. A structure manufacturing system which manufactures a structure, comprising:
a processing apparatus which produces the structure; and
the profile measuring apparatus according to claim 1 which measures a profile of the structure produced by the processing apparatus to obtain profile information of the structure.

22. The structure manufacturing system according to claim 21 further comprising a controller having a memory which stores the profile information of the structure measured by the profile measuring apparatus.

23. The structure manufacturing system according to claim 22 further comprising a designing apparatus which creates design information with respect to the structure,
wherein the processing apparatus produces the structure based on the design information created by the designing apparatus, and the controller has an inspection portion which compares the design information with the profile information to determine whether or not the structure is produced in accordance with the design information.

24. The structure manufacturing system according to claim 23 further comprising a repairing apparatus, wherein the inspection portion further determines whether or not the structure is repairable after determining the structure to be not produced in accordance with the design information, and the repairing apparatus repairs the structure under a condition that the inspection portion has determined the structure to be repairable.

25. The structure manufacturing system according to claim 24, wherein the inspection portion creates repair information indicating a defective portion and repairing amount of the structure based on the comparison between the design information and the profile information after determining the structure to be repairable, and the repairing apparatus repairs the structure based on the repair information.

26. A profile measuring apparatus which measures a profile of an object comprising:
a sensor unit including:
a projection unit configured to project a pattern on the object from a projection direction; and
a detection unit configured to take an image of the pattern to obtain image data for detecting the pattern irradiated on the object;
an object-rotation unit which rotates the object in two directions;
a sensor-rotation unit which is connected to the projection unit so as to be able to rotate the projection unit with the detection unit; and
a profile information acquisition unit which is connected to the sensor-rotation unit and acquires a profile information of the object,
wherein the sensor-rotation unit is configured to rotate the pattern relative to the object-rotation unit based on the profile information acquired by the profile information acquisition unit, and
wherein the sensor-rotation unit is configured to rotate the pattern by rotating the projection unit and the detection unit as a unit.

27. The profile measuring apparatus according to claim 1, wherein the sensor-rotation unit is configured to rotate the pattern by rotating the projection unit and the detection unit as a unit.

28. The profile measuring apparatus according to claim 26, wherein the sensor-rotation unit is configured to rotate the pattern by rotating the projection unit and the detection unit as a unit.

29. The profile measuring apparatus according to claim 4, wherein the sensor-rotation unit rotates the detection unit such that a direction in which the image is taken is changed.

* * * * *